United States Patent
Braudes et al.

(10) Patent No.: US 7,881,297 B2
(45) Date of Patent: Feb. 1, 2011

(54) PROVIDING COMMUNICATIONS INCLUDING AN EXTENDED PROTOCOL HEADER

(75) Inventors: Robert Eric Braudes, Dracut, MA (US); Robert S. Horne, Littleton, MA (US); Ignacio Miranda, Madrid (ES); Bruce Walsh, Londonderry, NH (US)

(73) Assignee: Avaya Inc., Basking Ridge, NJ (US)

( * ) Notice: Subject to any disclaimer, the term of this patent is extended or adjusted under 35 U.S.C. 154(b) by 853 days.

(21) Appl. No.: 11/514,580

(22) Filed: Sep. 1, 2006

(65) Prior Publication Data

US 2008/0056248 A1 Mar. 6, 2008

(51) Int. Cl.
*H04L 12/28* (2006.01)
*H04L 12/56* (2006.01)

(52) U.S. Cl. ..................................... 370/392
(58) Field of Classification Search .............. 370/392
See application file for complete search history.

(56) References Cited

U.S. PATENT DOCUMENTS

| | | | |
|---|---|---|---|
| 7,295,512 B2 * | 11/2007 | Takatani et al. | 370/229 |
| 2003/0012170 A1 * | 1/2003 | Vassilovski et al. | 370/342 |
| 2004/0243718 A1 * | 12/2004 | Fujiyoshi | 709/237 |
| 2005/0080913 A1 * | 4/2005 | Thomas | 709/230 |
| 2005/0129013 A1 * | 6/2005 | Rasanen | 370/389 |

OTHER PUBLICATIONS

IETF RFC 3261: SIP: Session Initiation Protocol, Jun. 2002.*
Mahy Cisco Systems R et al: "The Session Initiation Protocol (SIP) Replaces Header; draft-ietf-sip-replaces-05.txt" IETF Standard-Working-Draft, Internet Engineering Task Force, IETF, CH., vol. sip, No. 5, Feb. 16, 2004, XP015028035, ISSN: 0000-0004.
Sparks Dynamicsoft R: "The SIP Referred-By Mechanism; draft-ietf-sip-referredby-05.txt" IETF Standard-Working-Draft, Internet Engineering Task Force, IETF, CH, vol. sip, No. 5, Mar. 22, 2004, XP015028029, ISSN: 0000-0004.
Mankin Bell Labs A et al: "Change Process for the Session Initiation Protocol (SIP); rfc3427.txt" IETF Standard, Internet Engineering Task Force, IETF, CH, Dec. 1, 2002, XP015009214 ISSN: 0000-0003.
Partial European Search Report, Jun. 5, 2009, pp. 2.

* cited by examiner

*Primary Examiner*—Daniel Wu
*Assistant Examiner*—Frederick Ott
(74) *Attorney, Agent, or Firm*—Chapin IP Law, LLC; David W. Rouille, Esq.

(57) ABSTRACT

A method, apparatus and computer program product for providing communications including an extended protocol header is presented. A message is provided in a communication protocol, the message having a header. An extension is included in the header, the extension including additional information. The message is transmitted to a recipient, wherein the recipient is capable of utilizing the additional information contained in the extension to the header to provide additional functionality.

18 Claims, 4 Drawing Sheets

PROVIDING COMMUNICATIONS INCLUDING AN EXTENDED PROTOCOL HEADER

BACKGROUND

There are many applications of the Internet that require the creation and management of a session, where a session is considered an exchange of data between an association of participants. The implementation of these applications is complicated by the practices of participants: users may move between endpoints, they may be addressable by multiple names, and they may communicate in several different media—sometimes simultaneously. Numerous protocols have been authored that carry various forms of real-time multimedia session data such as voice, video, or text messages. The Session Initiation Protocol (SIP) works in concert with these protocols by enabling Internet endpoints (called user agents) to discover one another and to agree on a characterization of a session they would like to share. For locating prospective session participants, and for other functions, SIP enables the creation of an infrastructure of network hosts (called proxy servers) to which user agents can send registrations, invitations to sessions, and other requests. SIP invitations used to create sessions carry session descriptions that allow participants to agree on a set of compatible media types. SIP makes use of elements called proxy servers to help route requests to the user's current location, authenticate and authorize users for services, implement provider call-routing policies, and provide features to users. SIP also provides a registration function that allows users to upload their current locations for use by proxy servers. SIP runs on top of several different transport protocols. SIP is an application-layer control protocol that can establish, modify, and terminate multimedia sessions (conferences) such as Internet telephony calls. SIP can also invite participants to already existing sessions, such as multicast conferences.

In conventional systems multiple SIP recipient addresses are utilized, and the SIP Proxy is reconfigured when these addresses change or need to be mapped to different application servers. For passcode systems, a preconfigured recipient address is used to identify a service, requiring additional provisioning of addresses on a one-for-one basis with the service.

SUMMARY

Conventional mechanisms such as those explained above suffer from a variety of deficiencies. One such deficiency is that current solutions require the ultimate recipient address to be exposed in the standard protocol (e.g. SIP) header. They also require reconfiguration of the Proxy configuration as these addresses change. Additionally, current mechanisms require a one-to-one mapping between the address in the protocol header and the ultimate recipient on the receiving system. For authentication, the initiating user is usually requested to enter their credentials a second time.

The present method and apparatus providing communications including an extended protocol header solves several problems associated with conventional systems. The present method and apparatus providing communications including an extended protocol header enables additional security by allowing protocol messages to be routed to a hidden recipient not exposed to the external network in a standard fashion. Further, the present method and apparatus providing communications including an extended protocol header allows routing information to be changed in the network without requiring modification of the Proxy servers in the network. Further still the present method and apparatus providing communications including an extended protocol header allows message senders to utilize a single protocol address for multiple recipients. Additionally, the present method and apparatus providing communications including an extended protocol header allows the sender to embed an identifier and password/passcode for a desired service, enabling the receiver to authenticate the sender without having to prompt for this information.

Embodiments of the invention significantly overcome such deficiencies and provide mechanisms and techniques that provide communications including an extended protocol header. This provides the ability to modify the network routing configuration with minimal if any changes to the routing infrastructure, to use the same mechanism for passing service authentication information, and to map a single recipient address to multiple information services. This is accomplished by using the extended protocol header information for encoding the credentials in the protocol header, using a "hidden" address for added security, allowing service selection normally based on routing information to bypass the routing infrastructure and allowing a single protocol address to be multiplexed by using a second-level addressing mechanism.

In a particular embodiment of a method for communications including an extended protocol header, the method includes providing a message in a communication protocol, the message having a header. The method further includes including an extension in the header, the extension including additional information. Additionally, the method includes transmitting the message to a recipient, wherein the recipient is capable of utilizing the additional information contained in the extension to the header to provide additional functionality.

Other embodiments include a computer readable medium having computer readable code thereon for providing communications including an extended protocol header. The medium includes instructions for providing a message in a communication protocol, the message having a header. The computer readable medium further includes instructions for including an extension in the header, the extension including additional information and instructions for transmitting the message to a recipient, wherein the recipient is capable of utilizing the additional information contained in the extension to the header to provide additional functionality.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides communications including an extended protocol header as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing communications including an extended protocol header as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc, of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The presently disclosed method and apparatus for providing communications including an extended protocol header, in a particular embodiment incorporates the inclusion of an extended header (e.g., a SIP Header extension, supported by RFC 3261) to supply additional information to the recipient of the message. The additional information can include, but is not limited to, one or more of a revised recipient address, a service identifier, authentication information and a Personal Identification Number (PIN).

In the case where the information provided in the extended header comprises a revised recipient address, this information allows the recipient to route a call to a revised address, allowing for the rapid addition of new addresses into the receiving system without requiring reconfiguration of the underlying SIP network. The message gets sent to the original, published address, and the receiver then utilizes the revised recipient address contained in the extended header for internal routing to the desired recipient.

In the case where the information provided in the extended header comprises a service identifier, the service identifier is used to by the desired recipient to select the specific service.

In the case where the information provided in the extended header comprises authentication information, the authentication information enables silent authentication for cases where the sender has the information available that is required to authenticate the end user. This allows a message to be received by an initial service, such as a portal entry service, to perform initial user authentication and to then route the initial requestor to a secondary information service with the authentication information embedded in the message. This allows the secondary service to authenticate without having to re-request the credentials from the initiating user. This includes the password or passcode, and optionally a PIN.

Figure 1:
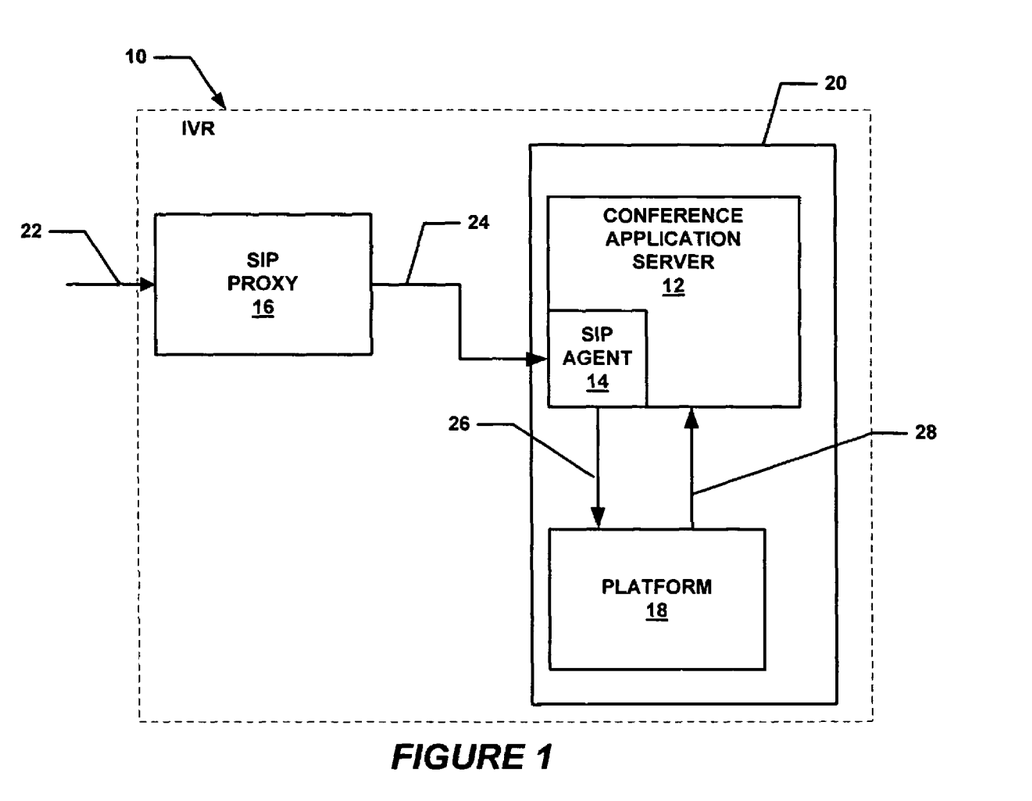
FIG. 1 comprises a block diagram of a system environment utilizing communications including an extended protocol header in accordance with embodiments of the invention.

In a particular example, referring to FIG. 1, a front-end Interactive Voice Response (IVR) system 10 is shown. The IVR system 10 is used to authenticate a user and then pass the call to one of a series of information services, where one of these services is a Conferencing System (CS) 20. The Conferencing system 20 includes a Conference Application Sever 12, a SIP agent 14 and a Platform 18. There needs to be security in the CS 20, where people should not be allowed entry into a subset of the conferences on the system without first going through the IVR (SIP Proxy 16) for authentication. Further, the identification of specific information services, in this example collaboration conferences (audio, video, data, etc.), may be hidden from the end users for additional security, but are known by the IVR 10 and the CS 20.

When the IVR 10 authenticates the user, it obtains the credentials required to gain entry to the collaboration conference, either directly from the user or by accessing an information store. These credentials are then passed to the CS 20 using an extended SIP header, such as the following message 24:

sip:<DNIS>; @bridgeDomain.com; conf=<InternalDNIS,confCode> where <InternalDNIS> is the extended protocol header, and is a new DNIS configured on the Conference Bridge in the Call Branding table that is typically only used for secure conferences. This is the Revised Recipient Address. "conf=" is used to identify the desired Information Service. If there are any additional credentials required, these are added between the angle brackets. For example, if a PIN is required, the format of the SIP line would be:

sip:<DNIS>, conf=<InternalDNIS,confCode,PIN>.

Upon receiving the SIP message 26, the CS 20 uses the InternalDNIS to validate the existence of the collaboration conference, and then validates the credentials (in this example, the "confCode"). If the credentials pass the validation, then the user is placed in the conference. The message 28 from Platform 18 to Conference Application Server 12 appears to Conference Application Server 12 as though the internal DNS was dialed. For added security, the SIP message can be delivered over an encrypted line, for example using Transport Level Security (TLS). In this case, the "sip:" is replaced with "sips:".

In a similar example, the SIP To: header contains the same DNIS as is used by outside callers. The Call Branding table can utilize a unique <HiddenDNIS> to avoid playing the prompt for the passcode, but the SIP Proxy will not need a new entry. The details are as follows:

The SIP To: header contains a To address in the following format:

sip:<DNIS>; conf=<HiddenDNIS,confCode> where <HiddenDNIS> is a new DNIS configured in the on the Conference Bridge in the Call Branding table. The SIP header is parsed, and the "<HiddenDNIS>,<confCode>" are passed to the Conferencing Application. A table is configured with an entry that matches the "<HiddenDNIS> that specifies the entry as a DIRECT call; i.e. the caller is not prompted for a passcode. The Conferencing Application plays the prompt specified in the matching entry. The Conferencing Application bypasses the passcode prompt, and the caller is placed into the conference without being prompted for a passcode in the same manner used today for DIRECT calls. If the <confCode> field contained a valid Moderator passcode, the caller is placed into the appropriate conference as a Moderator. If the <confCode> field contains a valid Participant passcode, the caller is placed into the appropriate conference as a Participant. If the <confCode> does not match a provisioned passcode, the call is dropped.

There are several advantages associated with the present method and apparatus providing communications including an extended protocol header. From a workflow perspective, the method and apparatus providing communications including an extended protocol header allows a Network Administrator to change routing information at a second level, avoiding the need to modify the primary network routing infrastructure when a new entry needs to be made. This reduces operational costs. This feature offers enhanced security by enabling a new method for passing credentials. Additionally this method and apparatus providing communications including an extended protocol header offers a new mechanism for single sign-on.

In other implementations of similar integrated systems, the user will typically be requested to enter his/her credentials multiple times, rather than using a single sign-on mechanism. Also, the routing tables in SIP proxies would need to be updated every time a new address is added to the network.

While the above description and examples used SIP as the protocol, it should be understood that this was done for the sake of explanation and the present method and apparatus providing communications including an extended protocol header invention is not intended to be limited to the SIP protocol or to Call Conferencing embodiments. Further, while a revised recipient address, a service identifier, and authentication information were discussed as examples of additional information provided in the extended header, it should be appreciated that the extended header could contain other information for providing different or additional functionality to the recipient of the message.

Figure 2A:
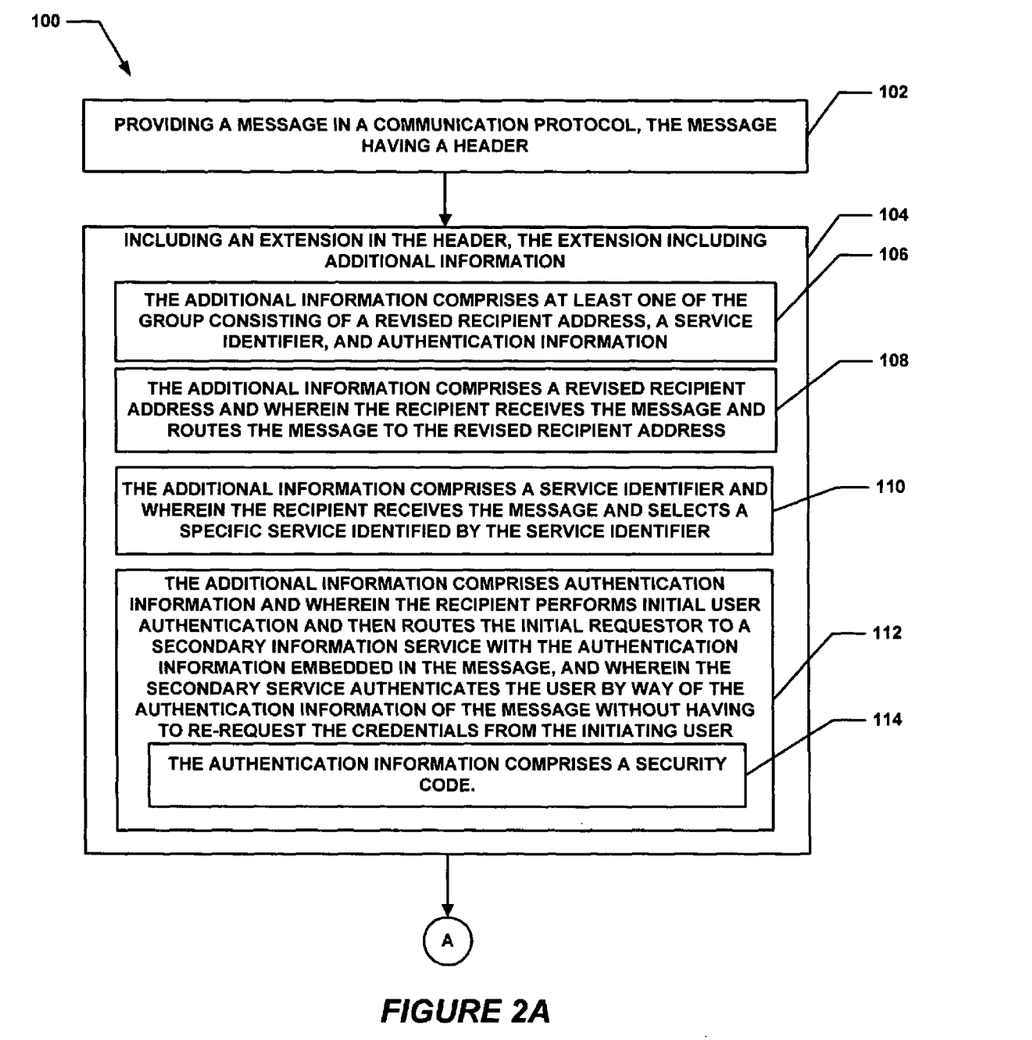
FIGS. 2A and 2B comprises a flow diagram of a particular method of providing communications including an extended protocol header in accordance with embodiments of the invention.
Figure 2B:
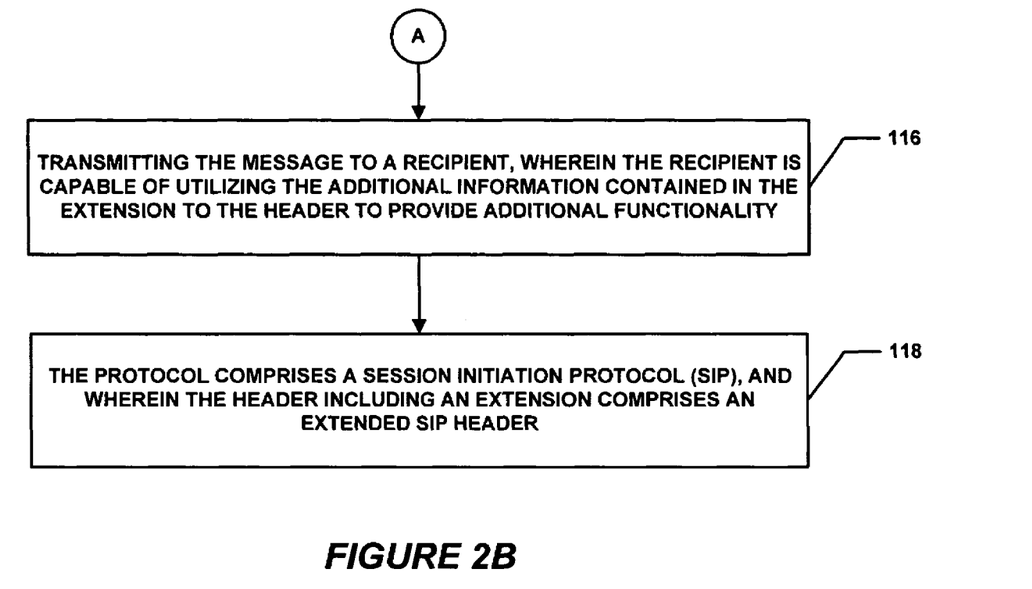

A flow chart of the presently disclosed method is depicted in FIGS. 2A and 2B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a method 100 of providing communications including an extended protocol header is shown. The method begins with processing block 102, which discloses providing a message in a communication protocol, the message having a header.

Processing block 104 states including an extension in the header, the extension including additional information. This can include as shown in processing block 106 at least one of the group consisting of a revised recipient address, a service identifier, and authentication information. In processing block 108 the additional information comprises a revised recipient address and wherein the recipient receives the message and routes the message to the revised recipient address. In processing block 110 the additional information comprises a service identifier and wherein the recipient receives the message and selects a specific service identified by the service identifier. In processing block 112 the additional information comprises authentication information and wherein the recipient performs initial user authentication and then route the initial requestor to a secondary information service with the authentication information embedded in the message, and wherein the secondary service authenticates the user by way of the authentication information of the message without having to re-request the credentials from the initiating user. As shown in processing block 114 the authentication information comprises a security code.

Processing continues with processing block 116, which recites transmitting the message to a recipient, wherein the recipient is capable of utilizing the additional information contained in the extension to the header to provide additional functionality.

Processing block 118 states wherein the protocol comprises a Session Initiation Protocol (SIP), and wherein the header including an extension comprises an extended SIP header.

The above-described method for providing communications including an extended protocol header enables additional security by allowing protocol messages to be routed to a hidden recipient not exposed to the external network in a standard fashion. Further, the present method allows routing information to be changed in the network without requiring modification of the Proxy servers in the network. Further still the present method allows message senders to utilize a single protocol address for multiple recipients. Additionally, the present method allows the sender to embed an identifier and password/passcode for a desired service, enabling the receiver to authenticate the sender without having to prompt for this information.

Figure 3:
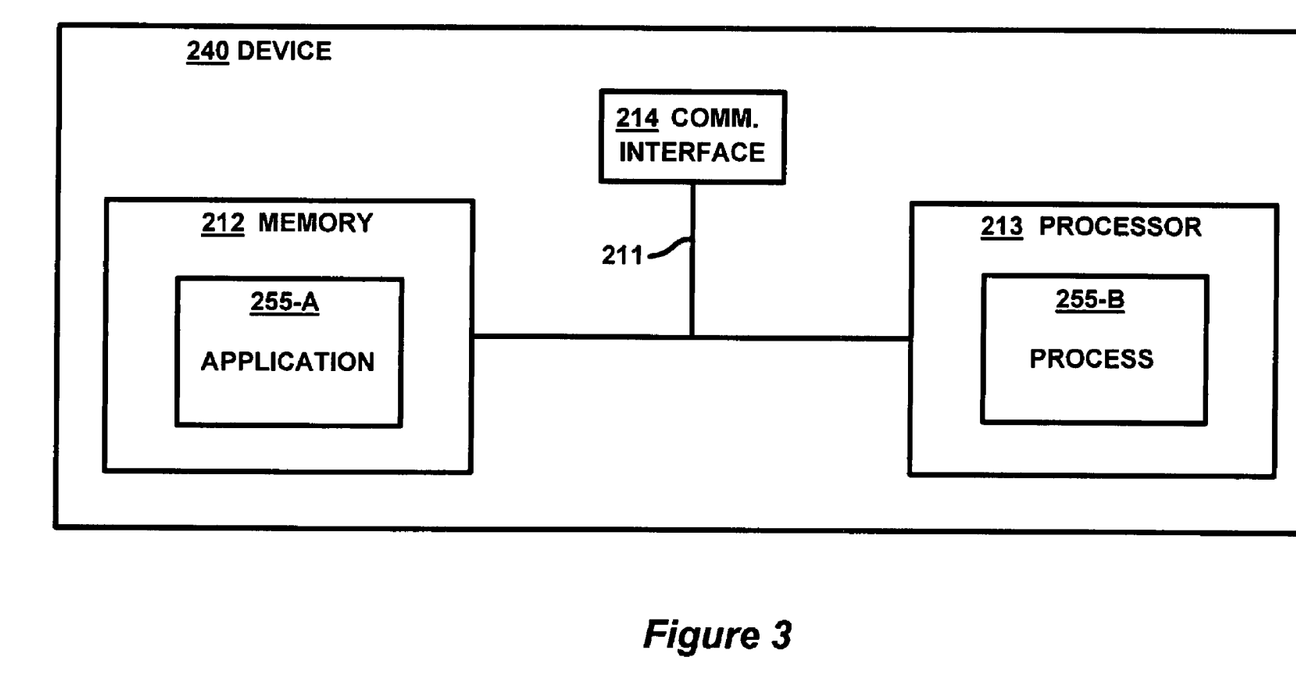
FIG. 3 illustrates an example computer system architecture for a computer system that performs providing communications including an extended protocol header in accordance with embodiments of the invention.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing communications including an extended protocol header comprising:
   providing a message in a communication protocol, said message having a header;
   including an extension in said header, said extension including additional information, wherein said extension in said header comprises the addition of additional fields to said header, wherein said additional information comprises authentication information and wherein said recipient performs initial user authentication and then routes an initial requestor to a secondary information service with the authentication information embedded in the message, and wherein the secondary service authenticates said user by way of said authentication information of said message without having to re-request credentials from an initiating user; and
   transmitting said message to a recipient, wherein said recipient is capable of utilizing said additional information contained in said extension to said header to provide additional functionality.

2. The method of claim 1 wherein said additional information comprises the revised recipient address and wherein said recipient receives said message and routes said message to the revised recipient address.

3. The method of claim 1 wherein said additional information comprises the service identifier and wherein said recipient receives said message and selects a specific service identified by said service identifier.

4. The method of claim 1 wherein said authentication information comprises a security code.

5. The method of claim 1 wherein said protocol comprises a Session Initiation Protocol (SIP), and wherein said header including the extension comprises an extended SIP header.

6. The method of claim 1 wherein said additional information provides additional security by allowing protocol messages to be routed to a hidden recipient not exposed to an external network.

7. A non-transitory computer readable medium having computer readable code thereon for providing communications including an extended protocol header, the medium comprising:
   instructions for providing a message in a communication protocol, said message having a header;
   instructions for including an extension in said header, said extension including additional information, wherein said extension in said header comprises the addition of additional fields to said header, wherein said additional information comprises the authentication information and wherein said recipient performs initial user authentication and then routes an initial requestor to a secondary information service with the authentication information embedded in the message, and wherein the secondary service authenticates said user by way of said authentication information of said message without having to re-request credentials from an initiating user; and
   instructions for transmitting said message to a recipient, wherein said recipient is capable of utilizing said additional information contained in said extension to said header to provide additional functionality.

8. The computer readable medium of claim 7 wherein said instructions for including the extension in said header, said extension including additional information comprises instructions for said additional information including the revised recipient address and wherein said recipient receives said message and routes said message to the revised recipient address.

9. The computer readable medium of claim 7 wherein said instructions for including the extension in said header, said extension including additional information comprises instructions for said additional information including the service identifier and wherein said recipient receives said message and selects a specific service identified by said service identifier.

10. The computer readable medium of claim 7 wherein said instructions for including an extension in said header, said extension including authentication information comprises a security code.

11. The computer readable medium of claim 7 wherein said protocol comprises a Session Initiation Protocol (SIP), and wherein said header including the extension comprises an extended SIP header.

12. The computer readable medium of claim 7 wherein said additional information provides additional security by allowing protocol messages to be routed to a hidden recipient not exposed to an external network.

13. A computer system comprising:

a memory;

a processor;

a communications interface;

an interconnection mechanism coupling the memory, the processor and the communications interface; and wherein the memory is encoded with an application that when performed on the processor, provides a process for processing information, the process causing the computer system to be capable of performing the operations of:

receiving a message in a communication protocol, said message having a header, the header including an extension in said header, wherein said extension in said header comprises the addition of additional fields to said header, said extension including additional information, wherein said additional information comprises the authentication information and wherein said recipient performs initial user authentication and then routes an initial requestor to a secondary information service with the authentication information embedded in the message. and wherein the secondary service authenticates said user by way of said authentication information of said message without having to re-request credentials from an initiating user; and transmitting said message to a recipient, wherein said recipient is capable of utilizing said additional information contained in said extension to said header to provide additional functionality.

14. The computer system of claim 13 wherein said additional information comprises the revised recipient address and wherein said recipient receives said message and routes said message to the revised recipient address.

15. The computer system of claim 13 wherein said additional information comprises the service identifier and wherein said recipient receives said message and selects a specific service identified by said service identifier.

16. The computer system of claim 13 wherein said authentication information comprises a security code.

17. The computer system of claim 13 wherein said protocol comprises a Session Initiation Protocol (SIP), and wherein said header including the extension comprises an extended SIP header.

18. The computer system of claim 13 wherein said additional information provides additional security by allowing protocol messages to be routed to a hidden recipient not exposed to an external network.

* * * * *

UNITED STATES PATENT AND TRADEMARK OFFICE
CERTIFICATE OF CORRECTION

| | |
|---|---|
| PATENT NO. | : 7,881,297 B2 |
| APPLICATION NO. | : 11/514580 |
| DATED | : February 1, 2011 |
| INVENTOR(S) | : Robert Eric Braudes et al. |

It is certified that error appears in the above-identified patent and that said Letters Patent is hereby corrected as shown below:

Claim 1, Column 7, Line 10, "said recipient performs initial user authentication and" should read -- a recipient performs initial user authentication and --

Signed and Sealed this
Ninth Day of August, 2011

David J. Kappos
*Director of the United States Patent and Trademark Office*